United States Patent
Allen-Ware et al.

(10) Patent No.: US 8,779,846 B2
(45) Date of Patent: *Jul. 15, 2014

(54) PERFORMANCE OF DIGITAL CIRCUITS USING CURRENT MANAGEMENT

(75) Inventors: Malcolm Scott Allen-Ware, Austin, TX (US); John Bruce Carter, Austin, TX (US); Heather Lynn Hanson, Austin, TX (US); Wei Huang, Austin, TX (US); Charles Robert Lefurgy, Austin, TX (US); Karthick Rajamani, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/549,748

(22) Filed: Jul. 16, 2012

(65) Prior Publication Data

US 2013/0035797 A1 Feb. 7, 2013

Related U.S. Application Data

(63) Continuation of application No. 13/195,684, filed on Aug. 1, 2011, now abandoned.

(51) Int. Cl.
```
G06F 1/10      (2006.01)
G06F 3/02      (2006.01)
H03K 17/16     (2006.01)
H03K 19/003    (2006.01)
```

(52) U.S. Cl.
USPC ............................................. 327/540; 326/33

(58) Field of Classification Search
USPC ........................................... 326/33; 700/286
See application file for complete search history.

(56) References Cited

U.S. PATENT DOCUMENTS

| | | |
|---|---|---|
| 5,974,556 A | 10/1999 | Jackson et al. |
| 6,601,179 B1 | 7/2003 | Jackson et al. |
| 7,132,764 B2 | 11/2006 | Kumar et al. |

(Continued)

FOREIGN PATENT DOCUMENTS

| | | |
|---|---|---|
| AU | 7249798 A | 11/1998 |
| CN | 101677220 A | 3/2010 |
| TW | 451121 B | 8/2001 |
| WO | 9850994 A1 | 11/1998 |

OTHER PUBLICATIONS

Rubio et al; Dynamic Processor Over-clocking for Improving Performance of Power-Constrained Systems, 2005.

(Continued)

*Primary Examiner* — Alexander H Taningco
*Assistant Examiner* — Dylan White
(74) *Attorney, Agent, or Firm* — Garg Law Firm, PLLC; Rakesh Garg; Parashos Kalaitzis (57) ABSTRACT

A method for improving the performance of a digital circuit is provided in the illustrative embodiments. A real frequency of operation of the digital circuit is adjusted using a control loop in the digital circuit, the adjusting the real frequency being responsive to a change in an operating condition of the digital circuit. A measurement of a current drawn by the digital circuit is received from a voltage regulator supplying electrical power to the digital circuit. An over-current target current value is received. A voltage output from the voltage regulator to the digital circuit is adjusted such that the current drawn by the digital circuit does not exceed the over-current target current value.

19 Claims, 7 Drawing Sheets

(56) References Cited

U.S. PATENT DOCUMENTS

| | | |
|---|---|---|
| 7,148,670 B2 | 12/2006 | Inn et al. |
| 7,293,181 B2 | 11/2007 | Weirzbicki |
| 8,127,157 B2 | 2/2012 | Bilak |
| 2008/0278223 A1* | 11/2008 | Kernahan et al. ............. 327/538 |
| 2009/0287944 A1 | 11/2009 | Bilak |
| 2011/0115454 A1* | 5/2011 | Benedict et al. ............. 323/282 |
| 2012/0144215 A1* | 6/2012 | Naffziger et al. ............. 713/320 |
| 2013/0033306 A1* | 2/2013 | Allen-Ware et al. ......... 327/540 |
| 2013/0207630 A1* | 8/2013 | Rahardjo et al. ............. 323/283 |

OTHER PUBLICATIONS

Hewlett-Packard; HP Power Capping and HP Dynamic Power Capping for ProLiant Servers, 2009.

Hanson, et al; Benchmarking for Power and Performance, 2008-2009.

IBM; Method for Integrated Heatsinks, Processor, and VR, Jul. 16, 2003.

UK examination report, Application No: GB1400568.0, Feb. 6, 2014.

* cited by examiner

PERFORMANCE OF DIGITAL CIRCUITS USING CURRENT MANAGEMENT

RELATED APPLICATION

The present application is a CONTINUATION of co-pending and commonly assigned U.S. patent application Ser. No. 13/195,684.

TECHNICAL FIELD

The present invention relates generally to a computer implemented method for improving the performance of digital circuits. Particularly, the present invention relates to a computer implemented method for improving the performance of a digital circuit by managing the current drawn by the digital circuit.

BACKGROUND

Modern day electronics include components that use integrated circuits. Integrated circuits are electronic circuits formed using Silicon as a substrate and by adding impurities to form solid-state electronic devices, such as transistors, diodes, and resistors. Commonly known as a "chip", an integrated circuit is generally encased in hard plastic. The components in modern day electronics generally appear to be rectangular black plastic pellets with connector pins protruding from the plastic encasement.

A digital circuit is an electronic circuit designed to accept digital inputs, perform some computation, and produce a digital output. A digital circuit may be a part of an integrated circuit, or may include more than one integrated circuit.

Electronic circuits consume electrical power for performing their intended tasks. The performance of the circuit depends on the characteristics of the electrical power being supplied to the circuit. For example, the voltage being supplied to the circuit corresponds to the frequency at which the circuit can operate. The frequency of the circuit is also known as "cycles" and is the smallest unit of time in which the circuit divides its operations to perform a given workload.

Typically, and up to a limit for a given electronic circuit, an increase in the frequency results in an increase in the performance of the electrical circuit. In other words, the higher the frequency, the larger the work performed by the electronic circuit, although the increase of performance is not necessarily proportional to the increase in the frequency of operation.

A relationship exists between the voltage applied to the circuit and the frequency at which the circuit can operate. Typically, and up to a limit for a given electronic circuit, an increase in the voltage results in an increase in the frequency of operation of the circuit, resulting in an increase in the performance of the electrical circuit. Again, the voltage, frequency, and performance are not proportionally related to one another, although the relationships are monotonic.

The increase in voltage, for example, is not boundless. Exceeding a maximum voltage can cause errors or faults in the electronic circuit resulting in system failure. Reducing the voltage below a certain threshold can have similar results as well.

SUMMARY

The illustrative embodiments provide a method for improving the performance of a digital circuit using current management. An embodiment adjusts a real frequency of operation of the digital circuit using a control loop in the digital circuit, the adjusting the real frequency being responsive to a change in an operating condition of the digital circuit. The embodiment receives, from a voltage regulator supplying electrical power to the digital circuit, a measurement of a current drawn by the digital circuit. The embodiment receives an over-current target current value. The embodiment adjusts a voltage output from the voltage regulator to the digital circuit such that the current drawn by the digital circuit does not exceed the over-current target current value.

BRIEF DESCRIPTION OF THE SEVERAL VIEWS OF THE DRAWINGS

The novel features believed characteristic of the embodiments are set forth in the appended claims. An embodiment of the invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Presently, a digital circuit's performance is increased by increasing the frequency of the digital circuit. For example, a "turbo" mode of a processor allows the processor to operate at approximately ten percent higher frequency.

The electrical power supplied to a digital circuit is typically managed by a voltage regulator or an equivalent thereof. The voltage regulator regulates the voltage applied to the digital circuit. Depending on the voltage being applied and certain other factors, components in the digital circuit adjust the frequency at which the circuit operates. For example, a critical path monitor (CPM) component in a digital circuit uses the voltage, the workload characteristics, and ambient conditions such as temperature and altitude information, to determine a suitable frequency at which to operate the digital circuit. As the workload, ambient conditions, voltage, or a combination thereof change, a feedback circuit coming from the CPM output adjusts the Digital Phase Lock Loop (DPLL) frequency in response to the changes.

Presently, for a digital circuit, upper and lower thresholds for frequency, voltage, or a combination thereof, are preset. The normal operating mode or a performance boosted mode, such as the turbo mode in some circuits, limit the voltage and frequency adjustments to within these thresholds.

The embodiments of the invention recognize that these thresholds are set using the worst case scenario for the circuit's operating conditions. For example, a processor's voltage and frequency thresholds may be set in such a way that the circuit will not fail even when a workload with the worst possible utilization characteristics is executed on the circuit under the worst ambient conditions for which the circuit is designed.

The embodiments recognize that such conservative thresholds significantly limit the performance of digital circuits because in actual operation, most digital circuits do not operate in the worst possible benchmark conditions. The embodiments further recognize that given the thresholds designed for the worst possible operating conditions, the total current drawn by the circuit is limited to such a low threshold that the current output of the voltage regulator need not be monitored for the risk of over-current in the system. Over-current is a condition where the current drawn by a digital circuit exceeds a threshold value of the circuit's total current draw. When an over-current condition arises in a digital circuit, the voltage regulator responds by lowering the voltage below the requested voltage setting, which can result in a timing failure of the digital circuit.

The embodiments further recognize that performance of a digital circuit can be further improved, much beyond the typical "turbo" mode of ten percent frequency increase. Some presently used techniques monitor the thermal condition of the chip to determine whether the chip can withstand a temporary acceleration beyond the ten percent turbo boost for a short period. Such techniques opportunistically increase the frequency by more than ten percent for a short duration, taking advantage of a low level of utilization and the resulting cooling of the chip. As soon as the temperature of the chip approaches a threshold, the acceleration is dropped to the turbo or normal operation levels.

The embodiments recognize that a super turbo mode of operation whereby the frequency of the circuit can be increased by more than ten percent for prolonged periods is feasible. The embodiments recognize that by monitoring the current output of a voltage regulator simultaneously with the voltage output, the performance of an associated digital circuit can be improved using not just the voltage and frequency adjustment "control knobs" but also a current output "control knob."

The illustrative embodiments used to describe the invention generally address and solve the above-described problems and other problems related to performance improvement of digital circuits. The illustrative embodiments provide a method for improving the performance of a digital circuit by managing the current drawn by the digital circuit.

An embodiment measures the current output of the voltage regulator that is supplying electrical power to a digital circuit. The embodiment adjusts the voltage thresholds, the frequency thresholds, or a combination thereof using the measured current values such that the digital circuit can operate at higher than normal or turbo mode current values without exceeding an over-current threshold, and while delivering performance exceeding the presently available turbo mode performance metrics.

The illustrative embodiments are described with respect to certain devices or components only as examples. Such descriptions are not intended to be limiting on the illustrative embodiments. For example, an illustrative embodiment described with respect to a processor can be implemented using any other digital circuit within the scope of the illustrative embodiments.

Furthermore, the illustrative embodiments may be implemented with respect to any type of electrical power source, including but not limited to voltage regulators. Any type of power source may provide the current data to an embodiment of the invention, either locally at a data processing system or over a data network, within the scope of the embodiments of the invention.

The illustrative embodiments are further described with respect to certain applications only as examples. Such descriptions are not intended to be limiting on the embodiments of the invention. An embodiment of the invention may be implemented with respect to any type of application, such as, for example, applications that are served, the instances of any type of server application, a platform application, a stand-alone application, an administration application, or a combination thereof.

An application, including an application implementing all or part of an embodiment, may further include data objects, code objects, encapsulated instructions, application fragments, services, and other types of resources available in a data processing environment. For example, a Java® object, an Enterprise Java Bean (EJB), a servlet, or an applet may be manifestations of an application with respect to which an embodiment of the invention may be implemented. (Java and all Java-based trademarks and logos are trademarks or registered trademarks of Oracle and/or its affiliates).

An illustrative embodiment may be implemented in hardware, software, or a combination thereof. An illustrative embodiment may further be implemented with respect to any type of data storage resource, such as a physical or virtual data storage device, that may be available in a given data processing system configuration.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

The illustrative embodiments are described using specific code, designs, architectures, layouts, schematics, and tools only as examples and are not limiting on the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 1:
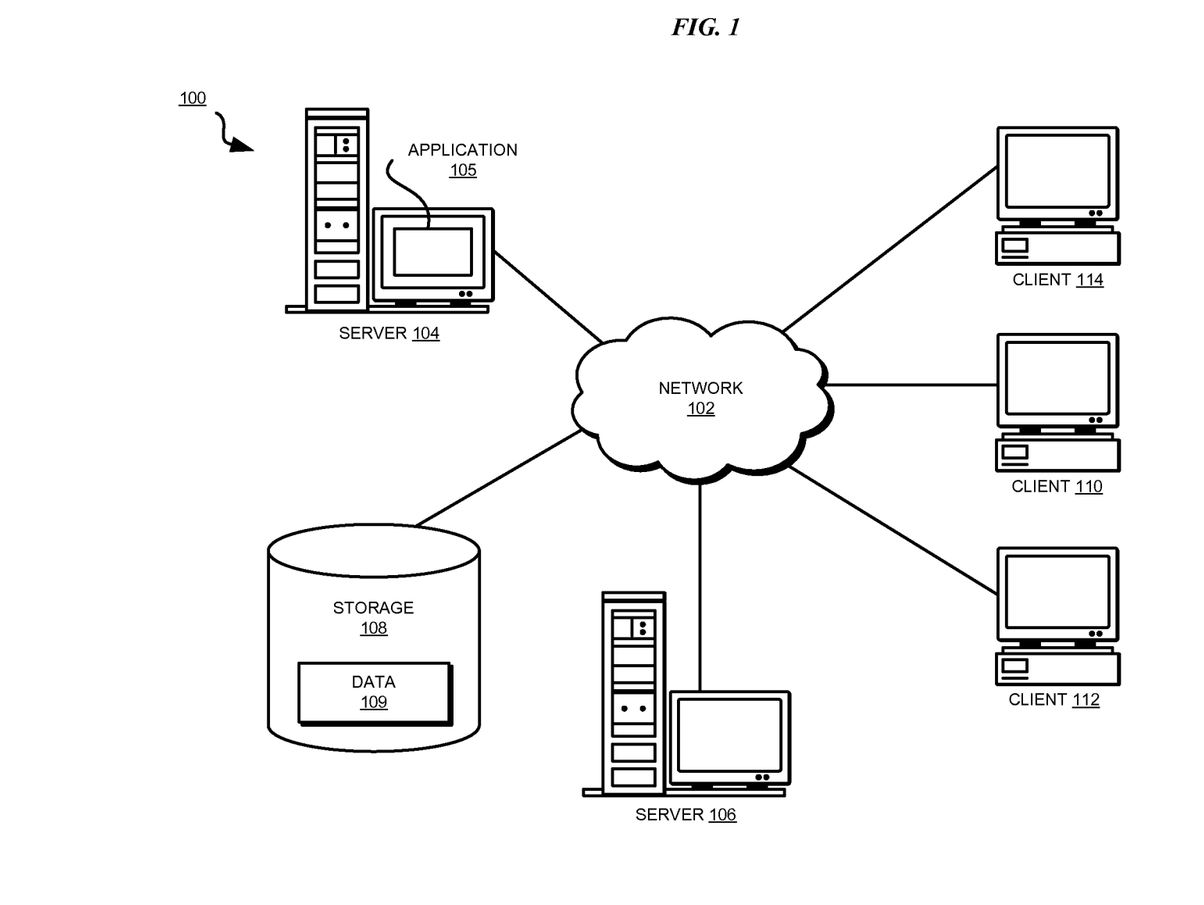
FIG. 1 depicts a pictorial representation of a network of data processing systems in which illustrative embodiments may be implemented.
Figure 2:
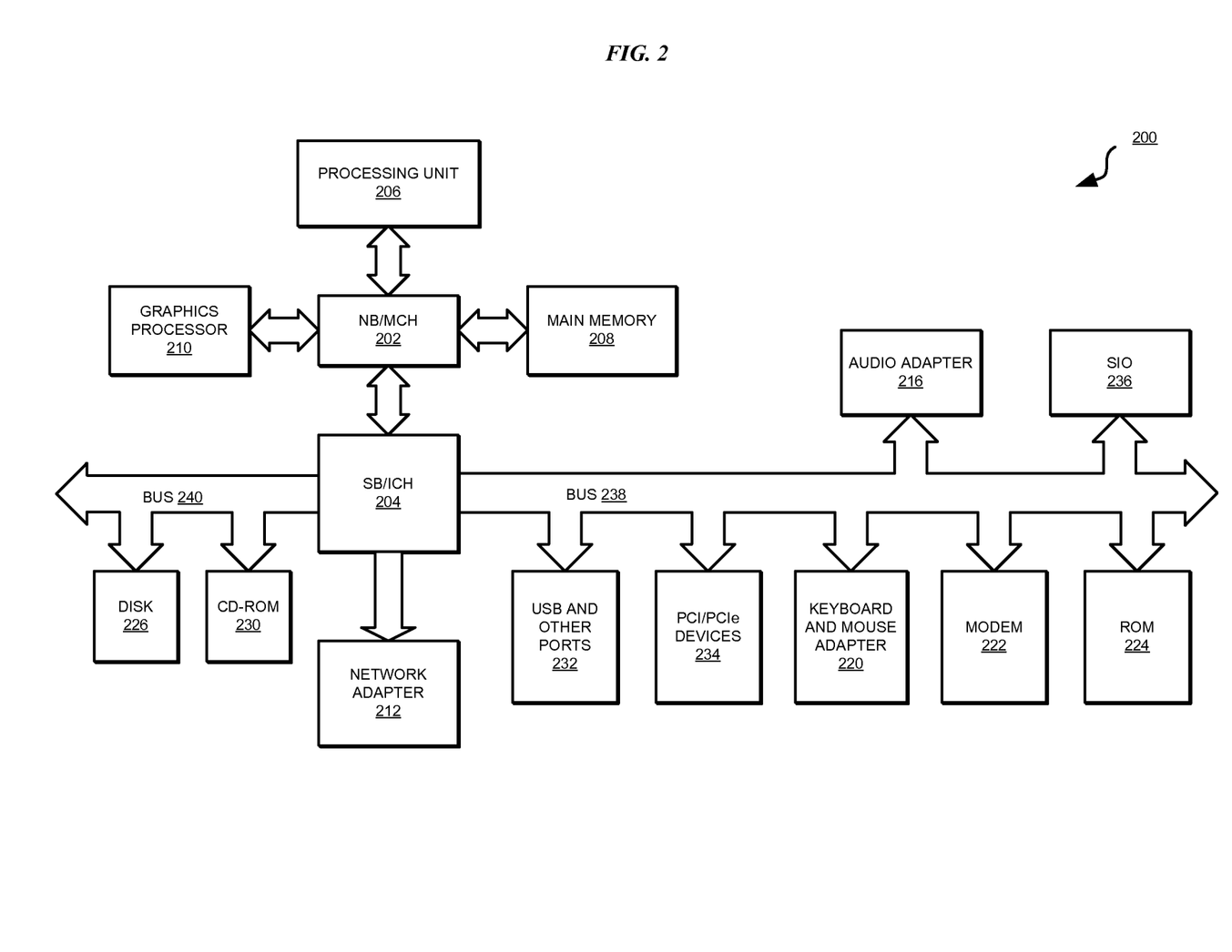
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Application 105 may be any suitable software application, hardware circuit, or a combination thereof, such as firmware, usable for performing the logic or computations of an embodiment.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes of the illustrative embodiments may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States, other countries, or both), or Linux® (Linux is a trademark of Linus Torvalds in the United States, other countries, or both). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle and/or its affiliates).

Program instructions for the operating system, the object-oriented programming system, the processes of the illustrative embodiments, and applications or programs are located on storage devices, such as hard disk drive 226, and may be loaded into a memory, such as, for example, main memory 208, read only memory 224, or one or more peripheral devices, for execution by processing unit 206. Program instructions may also be stored permanently in non-volatile memory and either loaded from there or executed in place. For example, the synthesized program according to an embodiment can be stored in non-volatile memory and loaded from there into DRAM.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
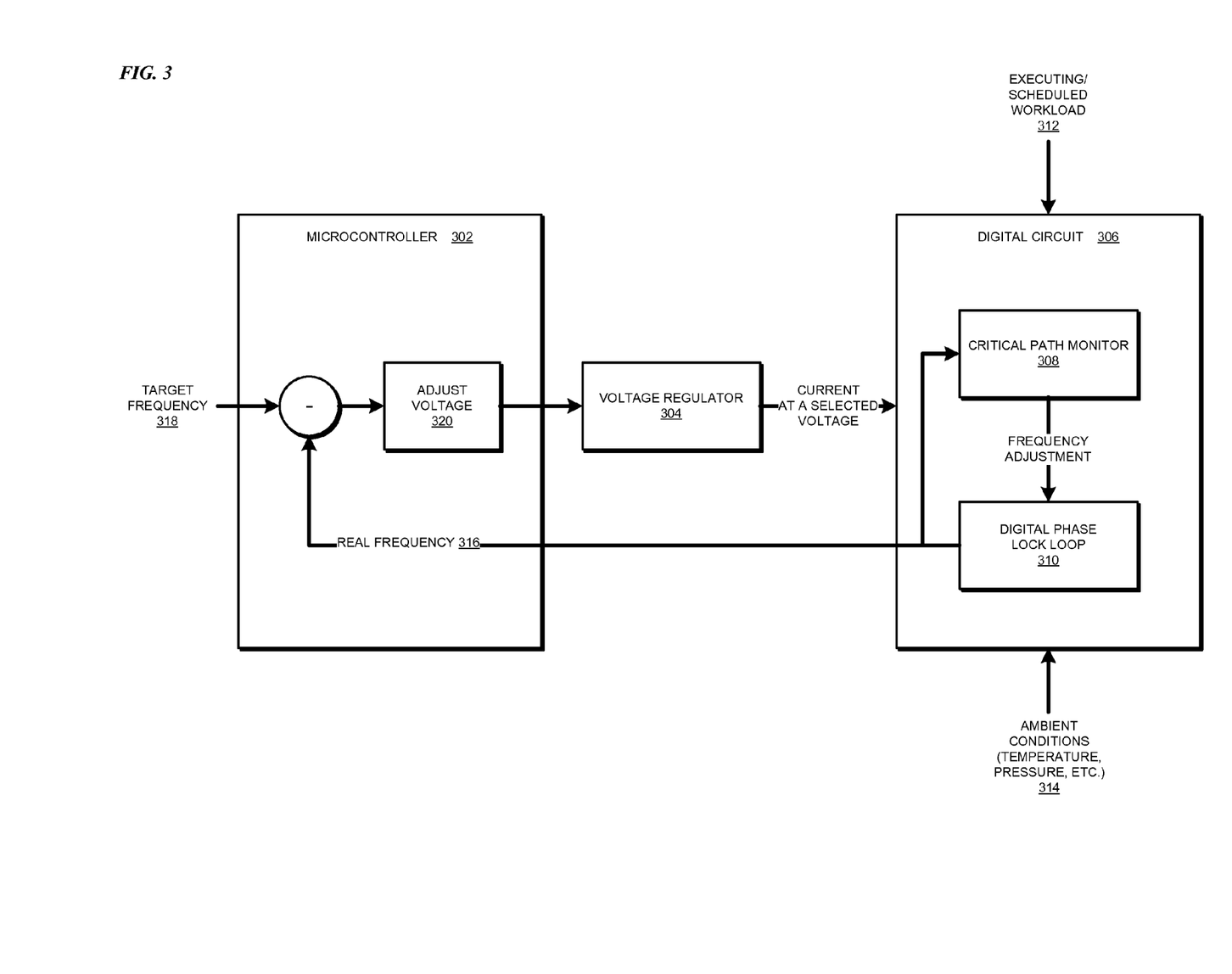
FIG. 3 depicts example frequency and voltage control loops with respect to which an illustrative embodiment may be implemented.

With reference to FIG. 3, this figure depicts example frequency and voltage control loops with respect to which an illustrative embodiment may be implemented. Microcontroller 302, voltage regulator 304, and digital circuit 306 may be components located in one data processing system, such as server 104 in FIG. 1, or distributed across multiple data processing systems.

Microcontroller 302 includes a control loop for adjusting the voltage of the current output of voltage regulator 304. Voltage regulator 304 is responsible for delivering the current at a stable and selected voltage. Digital circuit 306 includes a control loop for adjusting the frequency of operation of digital circuit 306. The control loop in digital circuit 306 includes CPM 308 and DPLL 310. CPM 308 and DPLL 310 are configured in a feedback loop that allows digital circuit 306 to adjust its operating frequency for a given supply voltage, given executing or scheduled workload 312, and given ambient conditions 314 such as ambient temperature, altitude, manufacturing variances, or wear.

Generally, the control loop in digital circuit 306 continuously sets the highest safe frequency at which digital circuit 306 can operate under the given conditions. This control loop generally reacts to change in the given conditions with a change in the frequency within nanoseconds of detecting the change in the given conditions. Without such a control loop in digital circuit 306, the actual frequency of the circuits will not be adjusted when the voltage is changed by microcontroller 302 and the changes in the supply voltage made by the microcontroller will cause the digital circuit to have a timing failure.

The control loop in microcontroller 302 compares the measured average performance of digital circuit 306 with the desired performance of digital circuit 306. This control loop lowers the voltage when the frequency exceeds a threshold and raises the voltage when the frequency falls below a threshold.

The control loop in microcontroller 302 receives real frequency 316 from digital circuit 306. Real frequency is the measured frequency at which digital circuit 306 may be operating at a given time. The control loop in microcontroller 302 further receives target frequency 318. Target frequency 318 is the frequency that may be desired for operating digital circuit 306, such as the frequency for turbo boosting.

The control loop in microcontroller 302 includes logic 320 for computing an adjustment in the voltage output of voltage regulator 304. Logic 320 instructs voltage regulator 304 to adjust the voltage output to a computed value depending on the then prevailing real frequency value and the desired target frequency value.

As depicted in this figure, the performance of digital circuit 306 is controlled by two controls—the frequency control and the voltage control. As explained above, the thresholds for the frequency variation and the voltage variation are set such that the current output of voltage regulator 304 never exceeds an over-current threshold.

An embodiment modifies this dual control loop configuration to factor the current output of voltage regulator 304, as described below. The modified configuration of an embodiment adds a third control loop for adjusting the frequency range of digital circuit 306 beyond the upper and lower thresholds of a turbo mode to a higher upper threshold, smaller lower threshold, or a combination thereof. An embodiment allows, for example, operating a presently available digital circuit and the same voltage regulator at a higher frequency than the prior art upper threshold frequency, and backing off from that higher frequency using a measurement of a current output of voltage regulator 304.

Figure 4:
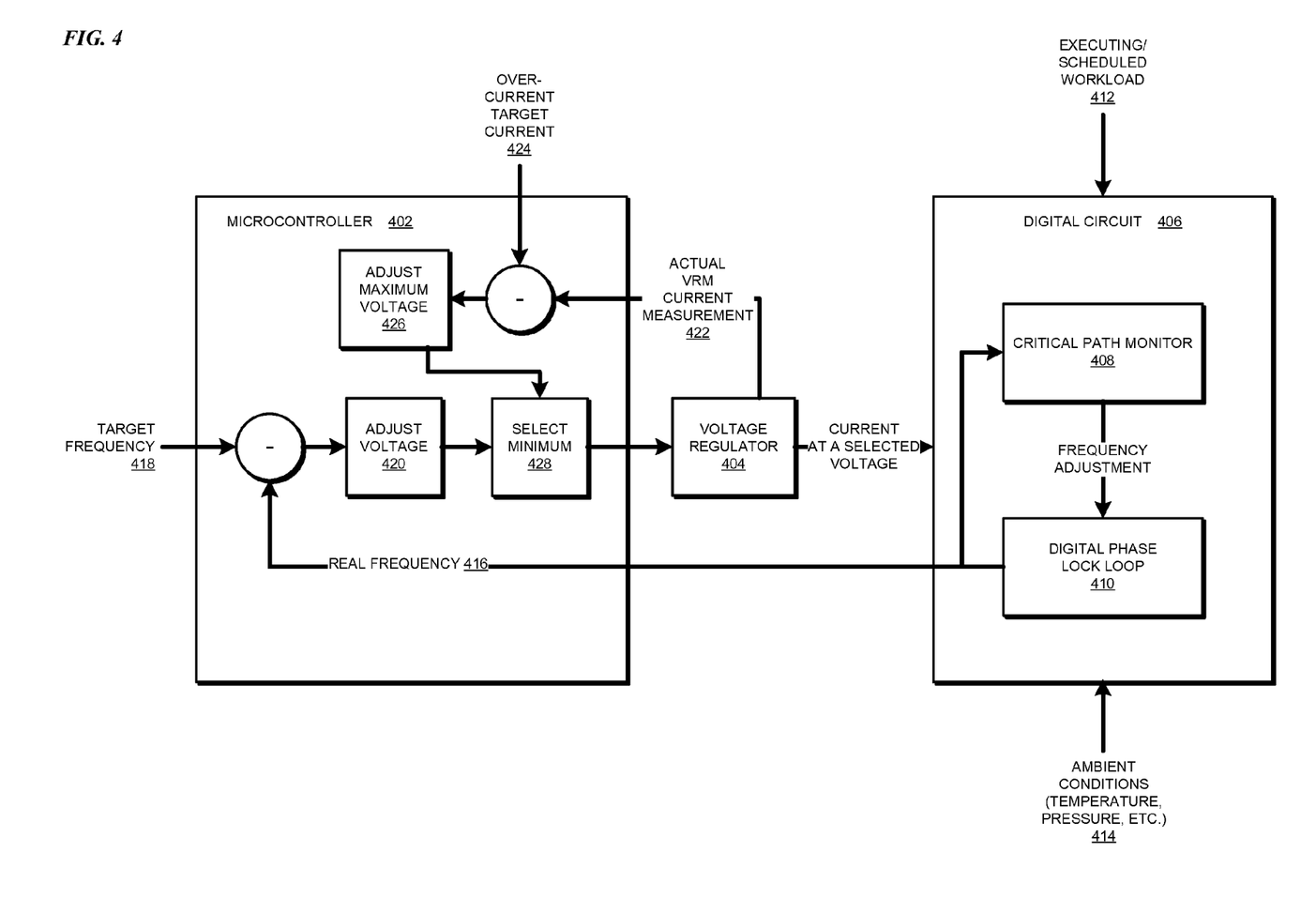
FIG. 4 depicts an enhanced configuration for adjusting frequency and voltage using the current output information in accordance with an illustrative embodiment.

With reference to FIG. 4, this figure depicts an enhanced configuration for adjusting frequency and voltage using the current output information in accordance with an illustrative embodiment. Artifacts 402-420 correspond to artifacts 302-320 respectively in FIG. 3, and are similarly implemented.

Microcontroller 402 is modified to receive actual voltage regulator module (VRM) current 422 from voltage regulator 404. Microcontroller 402 also receives a value for over-current target current 424.

Note that over-current target current 424 is a "soft-target" value in that over-current target current 424 is configurable or changeable according to the operating conditions of digital circuit 406. In this respect, over-current target current 424 is different from the over-current value that is inherently set in the prior art when the thresholds for the voltage and the frequency are set. As shown, over-current target current 424 can be set or supplied independent of any thresholds for voltage or frequency.

Microcontroller 402 further includes logic 426 for adjusting a maximum voltage threshold value. In operation, using actual VRM current measurement 422 and over-current target current 424, logic 426 computes a desirable upper (maximum) threshold for the voltage that should be supplied to digital circuit 406. The desirable upper threshold for the voltage will likely be revised in this manner many times during the operation of digital circuit 406.

For example, at a given time, if logic 426 determines that actual VRM current measurement 422 is greater than over-current target current, logic 426 can set the upper threshold for the voltage to be lower than the voltage value at voltage regulator 404. Logic 428 selects the smaller of (minimum of) the adjusted voltage from logic 420 and logic 426 and instructs voltage regulator 404 to adjust the voltage supplied to digital circuit 406 accordingly.

Conversely, if actual VRM current measurement 422 is less than over-current target current 424, logic 426 may raise the upper threshold for voltage. Logic 428 may then select the lower of the raised upper threshold voltage from logic 426 and the adjusted voltage from logic 420 and instruct voltage regulator 404 accordingly.

Operating in this manner, the enhancements to the prior art dual control loop configuration add a third control loop based on the current draw of digital circuit 406. As described above, logic 428 prevents an over-current situation by selecting the lower of the two voltage adjustment values. Furthermore, because the third control loop depends on the fast-response frequency control loop in digital circuit 406, large current changes and the consequential current spikes are also avoided, avoiding transitory over-current situation.

Figure 5:
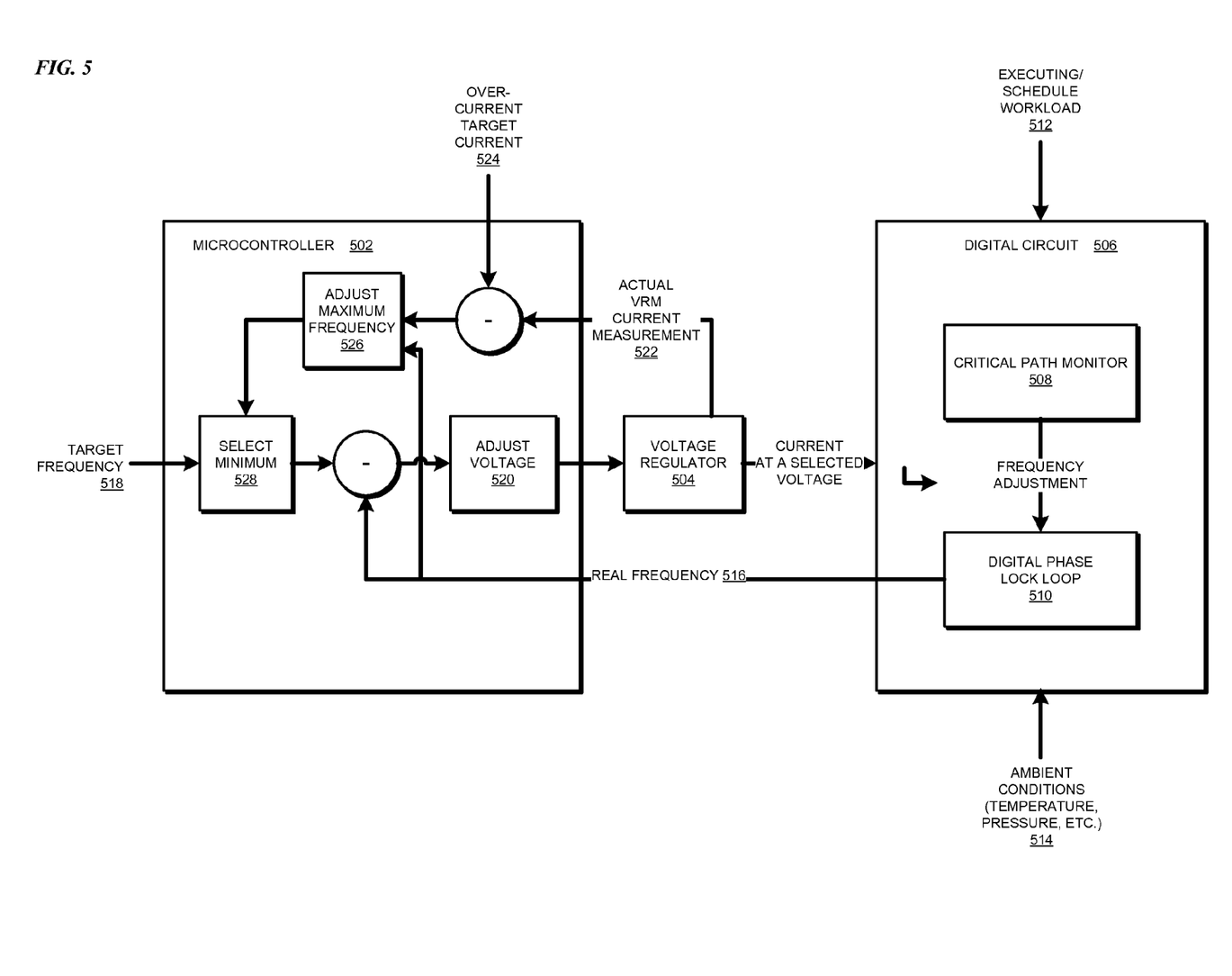
FIG. 5 depicts another enhanced configuration for adjusting frequency and voltage using the current output information in accordance with an illustrative embodiment.

With reference to FIG. 5, this figure depicts another enhanced configuration for adjusting frequency and voltage using the current output information in accordance with an illustrative embodiment. Artifacts 502-520 correspond to artifacts 402-420 respectively in FIG. 4, and are similarly implemented.

Microcontroller 502 is modified to receive actual VRM current measurement 522 from voltage regulator 504. Microcontroller 502 also receives a value for over-current target current 524. As in FIG. 4, over-current target current 524 is a "soft-target" value, configurable or changeable according to the operating conditions of digital circuit 506.

Microcontroller 502 further includes logic 526 for adjusting a maximum frequency threshold value. In operation, using actual VRM current measurement 522 and over-current target current 524, logic 526 computes a desirable upper (maximum) threshold for the frequency at which digital circuit 506 should operate. The desirable upper threshold for the frequency will likely be revised in this manner many times during the operation of digital circuit 506.

For example, at a given time, if logic 526 determines that actual VRM current measurement 522 is greater than over-current target current, logic 526 can set the upper threshold for the frequency to be lower than real frequency 516 measured by DPLL 510. Conversely, if actual VRM current measurement 522 is lower than over-current target current 524, logic 526 may raise the upper threshold on the frequency to allow digital circuit to operate at a higher frequency.

Logic 528 selects the smaller of (minimum of) the adjusted maximum frequency (computed upper frequency threshold) from logic 526 and target frequency 518. Logic 520 uses the smaller of the two frequency values from logic 528 and real frequency 516 to determine an adjustment in the voltage being supplied to digital circuit 506. Logic 520 instructs voltage regulator 504 to adjust the voltage supplied to digital circuit 506 accordingly.

Operating in this manner, the enhancements to the prior art dual control loop configuration add another variation of the third control loop based on the current draw of digital circuit 506. As described above, logic 528 prevents an over-current situation by selecting the lower of the two frequency upper threshold values. Furthermore, as in FIG. 4, because this variation of the third control loop also depends on the fast-response frequency control loop in digital circuit 506, large current changes and the consequential current spikes are also avoided, avoiding transitory over-current situation.

Figure 6:
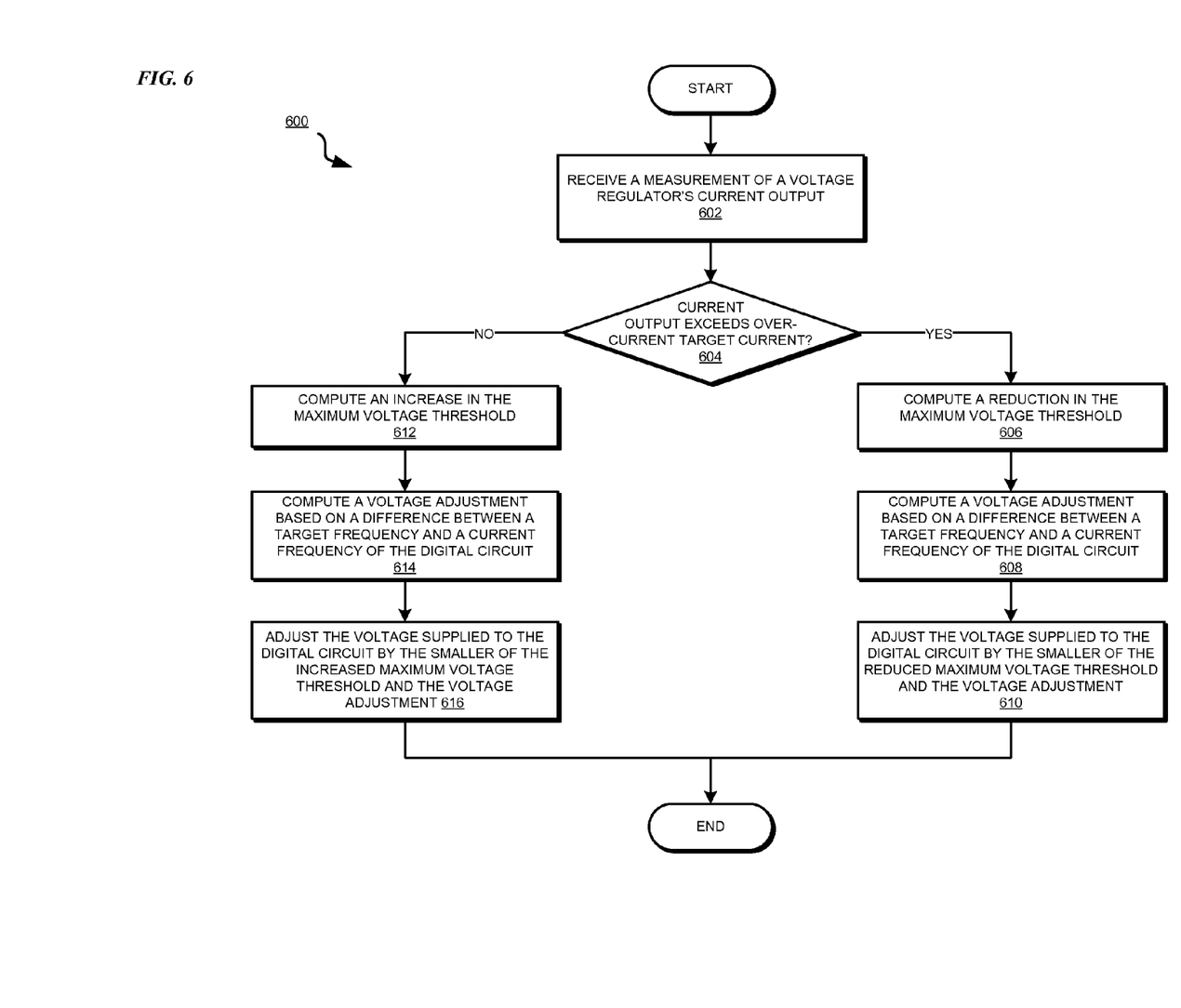
FIG. 6 depicts a flowchart of a process of improving the performance of a digital circuit by using the current draw of the circuit in accordance with an illustrative embodiment.

With reference to FIG. 6, this figure depicts a flowchart of a process of improving the performance of a digital circuit by using the current draw of the circuit in accordance with an illustrative embodiment. Process 600 may be implemented in a modified microcontroller, such as microcontroller 402 in FIG. 4.

Process 600 begins by receiving a measurement of the current output of the voltage regulator of the digital circuit (step 602). Process 600 determines whether the current output exceeds an over-current target current (step 604).

If the current output exceeds the over-current target current ("Yes" path of step 604), process 600 computes a reduction in the maximum (upper) voltage threshold for the digital circuit (step 606). Process 600 computes a voltage adjustment based on a difference between a target frequency and a current frequency of the digital circuit (step 608).

Process 600 adjusts the voltage supplied to the digital circuit by the smaller of the reduced maximum voltage threshold and the voltage adjustment of step 608 (step 610). Process 600 may end thereafter or may return to step 602 for another iteration.

If the current output does not exceed the over-current target current ("No" path of step 604), process 600 computes an increase in the maximum (upper) voltage threshold for the digital circuit (step 612). Process 600 computes a voltage adjustment based on a difference between a target frequency and a current frequency of the digital circuit (step 614).

Process 600 adjusts the voltage supplied to the digital circuit by the smaller of the increased maximum voltage threshold and the voltage adjustment of step 614 (step 616). Process 600 may end thereafter or may return to step 602 for another iteration.

Figure 7:
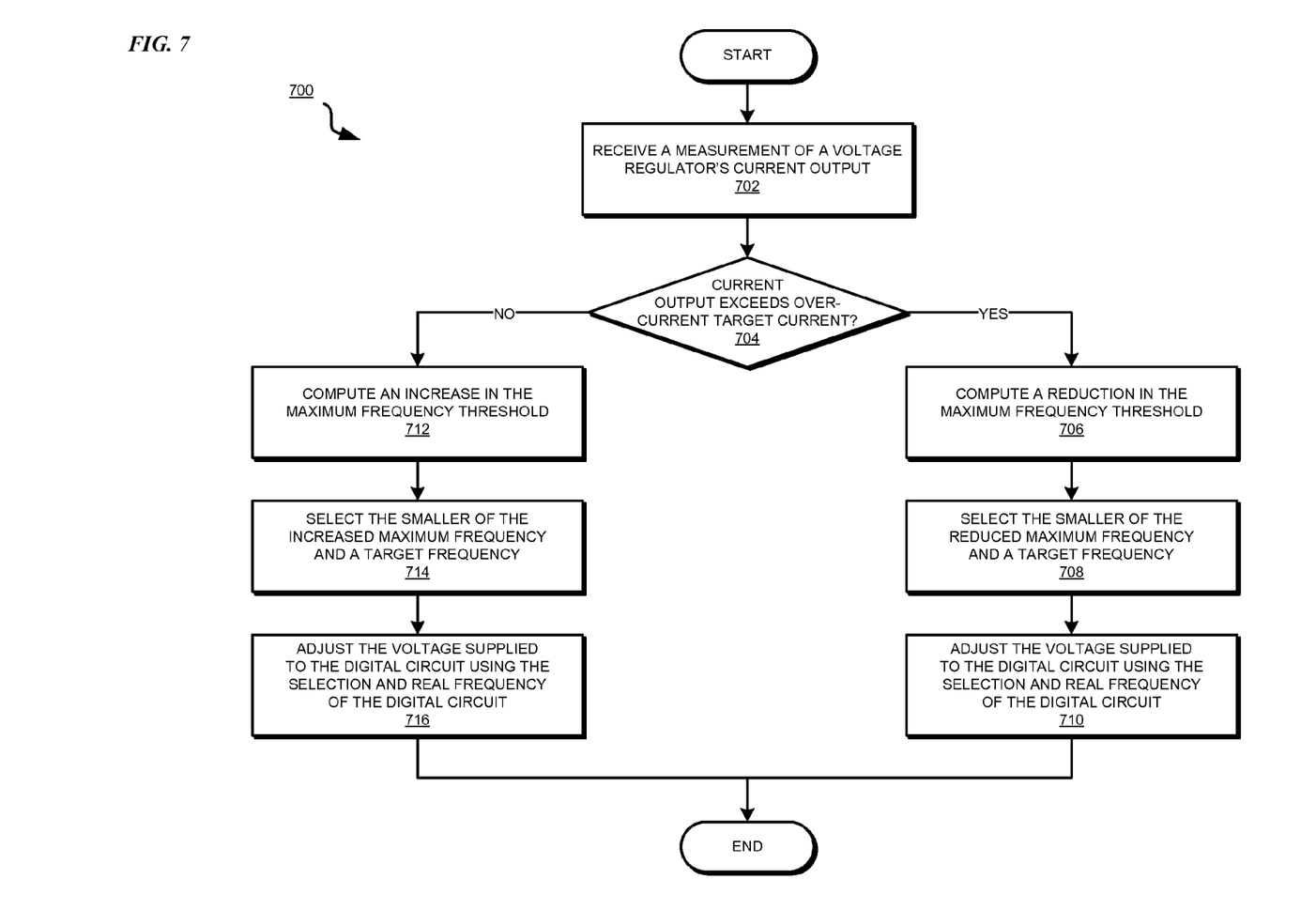
FIG. 7 depicts a flowchart of another process of improving the performance of a digital circuit by using the current draw of the circuit in accordance with an illustrative embodiment.

With reference to FIG. 7, this figure depicts a flowchart of another process of improving the performance of a digital circuit by using the current draw of the circuit in accordance with an illustrative embodiment. Process 700 may be implemented in a modified microcontroller, such as microcontroller 502 in FIG. 5.

Process 700 begins by receiving a measurement of current output of a voltage regulator of a digital circuit (step 702). Process 700 determines whether the current output exceeds an over-current target current (step 704).

If the current output exceeds the over-current target current ("Yes" path of step 704), process 700 computes a reduction in the maximum (upper) frequency threshold for the digital circuit (step 706). Process 700 selects the smaller of the reduced maximum frequency and a target frequency for the digital circuit (step 708).

Process 700 adjusts the voltage supplied to the digital circuit using the selection of step 708 and the real frequency of operation of the digital circuit (step 710). Process 700 may end thereafter or may return to step 702 for another iteration.

If the current output does not exceed the over-current target current ("No" path of step 704), process 700 computes an increase in the maximum (upper) frequency threshold for the digital circuit (step 712). Process 700 selects the smaller of the increased maximum frequency and a target frequency for the digital circuit (step 714).

Process 700 adjusts the voltage supplied to the digital circuit using the selection of step 714 and the real frequency of operation of the digital circuit (step 716). Process 700 may end thereafter or may return to step 702 for another iteration.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method is provided in the illustrative embodiments for improving the performance of a digital circuit by using the current draw information in addition to the voltage and frequency of operation of the digital circuit and their respective thresholds. Using an embodiment of the invention, information pertaining to the current drawn by the digital circuit is combined with the operating frequency to adjust the upper thresholds of the voltage, frequency, or both. For example, while FIGS. 4 and 5 depict two variations of a third current-based control loop, an implementation may combine the two variations and create a third control loop that factors in the current draw with both the voltage threshold and the frequency threshold.

Unlike the prior art, the over-current target current can be set as a soft target and can be changed according to the changing operating conditions of the digital circuit. An embodiment prevent an over-current condition even with the flexible (soft) over-current target current by relying on the fast acting frequency adjustment feedback loop.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for improving performance of a digital circuit, the method comprising:
  adjusting a real frequency of operation of the digital circuit using a control loop in the digital circuit, the adjusting the real frequency being responsive to a change in an operating condition of the digital circuit,
  wherein the control loop comprises a critical path monitor and a digital phase lock loop,
  wherein the operating condition comprises a combination of a supply voltage to the digital circuit, workload to execute using the digital circuit, and ambient conditions in which to operate the digital circuit, and
  wherein the control loop reacts to the change in the operating condition in the order of nanoseconds of detecting the change;
  receiving, from a voltage regulator supplying electrical power to the digital circuit, a measurement of a current drawn by the digital circuit;
  receiving an over-current target current value; and
  adjusting a voltage output from the voltage regulator to the digital circuit such that the current drawn by the digital circuit does not exceed the over-current target current value.

2. The computer implemented method of claim 1, wherein reducing the voltage output is responsive to the adjusting causes the current drawn by the digital circuit to reduce.

3. The computer implemented method of claim 1, further comprising:
  adjusting an upper threshold for the voltage output to form an adjusted upper voltage threshold;
  computing an adjustment to the voltage output using the real frequency of operation of the digital circuit and a target frequency of operation of the digital circuit to form an adjusted voltage output;
  selecting the smaller of the adjusted upper voltage threshold and the adjusted voltage output to form a selected voltage adjustment; and
  performing the adjusting at the voltage regulator using the selected voltage adjustment.

4. The computer implemented method of claim 3, wherein responsive to the current drawn exceeding the over-current target current value, the adjusting the upper threshold for voltage output includes reducing the upper threshold for voltage output.

5. The computer implemented method of claim 3, wherein responsive to the over-current target current value exceeding the current drawn, the adjusting the upper threshold for voltage output includes raising the upper threshold for voltage output.

6. The computer implemented method of claim 3, wherein responsive to the over-current target current value exceeding the current drawn, the adjusting the upper threshold for operating frequency of the digital circuit includes raising the upper threshold for operating frequency of the digital circuit.

7. The computer implemented method of claim 1, further comprising:
  adjusting an upper threshold for operating frequency of the digital circuit to form an adjusted upper frequency threshold;
  selecting the smaller of the adjusted upper frequency threshold and a target frequency of operation of the digital circuit to form selected frequency adjustment;
  computing an adjustment to the voltage output using the real frequency of operation of the digital circuit and the selected frequency adjustment to form an adjusted voltage output;
  selecting the smaller of the adjusted upper voltage threshold and the adjusted voltage output to form a selected voltage adjustment; and
  performing the adjusting at the voltage regulator using the selected voltage adjustment.

8. The computer implemented method of claim 7, wherein responsive to the current drawn exceeding the over-current target current value, the adjusting the upper threshold for operating frequency of the digital circuit includes reducing the upper threshold for operating frequency of the digital circuit.

9. A computer usable program product comprising a non-transitory computer usable storage medium including computer usable code for improving performance of a digital circuit, wherein a real frequency of operation of the digital circuit is adjusted using a control loop in the digital circuit, the real frequency being adjusted responsive to a change in an operating condition of the digital circuit, the computer usable code comprising:
  computer usable code for receiving, from a voltage regulator supplying electrical power to the digital circuit, a measurement of a current drawn by the digital circuit;
  computer usable code for receiving an over-current target current value;
  computer usable code for changing a threshold that limits one of (i) an operating frequency, and (ii) a voltage output from the voltage regulator, wherein changing the threshold changes a value of the threshold to beyond a previous value of the threshold in a direction of the threshold; and
  computer usable code for adjusting the voltage output from the voltage regulator beyond a voltage corresponding to the previous value of the threshold and up to a voltage corresponding to the value of the threshold without allowing the current drawn by the digital circuit to exceed the over-current target current value.

10. The computer usable program product of claim 9, wherein reducing the voltage output is responsive to the adjusting causes the current drawn by the digital circuit to reduce.

11. The computer usable program product of claim 9, wherein the threshold is an upper threshold for the voltage output, further comprising:
  computer usable code for adjusting the upper threshold for the voltage output to form an adjusted upper voltage threshold;
  computer usable code for computing an adjustment to the voltage output using the real frequency of operation of the digital circuit and a target frequency of operation of the digital circuit to form an adjusted voltage output;
  computer usable code for selecting the smaller of the adjusted upper voltage threshold and the adjusted voltage output to form a selected voltage adjustment; and
  computer usable code for performing the adjusting at the voltage regulator using the selected voltage adjustment.

12. The computer usable program product of claim 11, wherein responsive to the current drawn exceeding the over-current target current value, the adjusting the upper threshold for voltage output includes reducing the upper threshold for voltage output.

13. The computer usable program product of claim 11, wherein responsive to the over-current target current value exceeding the current drawn, the adjusting the upper threshold for voltage output includes raising the upper threshold for voltage output.

14. The computer usable program product of claim 11, wherein responsive to the over-current target current value exceeding the current drawn, the adjusting the upper threshold for operating frequency of the digital circuit includes raising the upper threshold for operating frequency of the digital circuit.

15. The computer usable program product of claim 9, wherein the threshold is an upper threshold for operating frequency, further comprising:
- computer usable code for adjusting the upper threshold for operating frequency of the digital circuit to form an adjusted upper frequency threshold;
- computer usable code for selecting the smaller of the adjusted upper frequency threshold and a target frequency of operation of the digital circuit to form selected frequency adjustment;
- computer usable code for computing an adjustment to the voltage output using the real frequency of operation of the digital circuit and the selected frequency adjustment to form an adjusted voltage output;
- computer usable code for selecting the smaller of the adjusted upper voltage threshold and the adjusted voltage output to form a selected voltage adjustment; and
- computer usable code for performing the adjusting at the voltage regulator using the selected voltage adjustment.

16. The computer usable program product of claim 15, wherein responsive to the current drawn exceeding the over-current target current value, the adjusting the upper threshold for operating frequency of the digital circuit includes reducing the upper threshold for operating frequency of the digital circuit.

17. The computer usable program product of claim 9, wherein the computer usable code is stored in a computer readable storage medium in a data processing system, and wherein the computer usable code is transferred over a network from a remote data processing system.

18. The computer usable program product of claim 9, wherein the computer usable code is stored in a computer readable storage medium in a server data processing system, and wherein the computer usable code is downloaded over a network to a remote data processing system for use in a computer readable storage medium associated with the remote data processing system.

19. A data processing system for improving performance of a digital circuit, the data processing system comprising:
- a storage device including a storage medium, wherein the storage device stores computer usable program code; and
- a processor, wherein the processor executes the computer usable program code, and wherein the computer usable program code comprises:
- a control loop in the digital circuit for adjusting a real frequency of operation of the digital circuit, the adjusting the real frequency being responsive to a change in an operating condition of the digital circuit;
- computer usable code for receiving, from a voltage regulator supplying electrical power to the digital circuit, a measurement of a current drawn by the digital circuit;
- computer usable code for receiving an over-current target current value;
- computer usable code for changing a threshold that limits one of (i) an operating frequency, and (ii) a voltage output from the voltage regulator, wherein changing the threshold changes a value of the threshold to beyond a previous value of the threshold in a direction of the threshold; and
- computer usable code for adjusting the voltage output from the voltage regulator beyond a voltage corresponding to the previous value of the threshold and up to a voltage corresponding to the value of the threshold without allowing the current drawn by the digital circuit to exceed the over-current target current value.

* * * * *